US011434777B2

United States Patent
Berry (10) Patent No.: US 11,434,777 B2
(45) Date of Patent: Sep. 6, 2022

(54) TURBOMACHINE CLEARANCE CONTROL USING MAGNETICALLY RESPONSIVE PARTICLES

(71) Applicant: General Electric Company, Schenectady, NY (US)

(72) Inventor: Jonathan Dwight Berry, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/126,276

(22) Filed: Dec. 18, 2020

(65) Prior Publication Data

US 2022/0195883 A1  Jun. 23, 2022

(51) Int. Cl.
*F01D 11/12* (2006.01)

(52) U.S. Cl.
CPC .......... *F01D 11/12* (2013.01); *F05D 2220/32* (2013.01)

(58) Field of Classification Search
CPC .......... F01D 11/08; F01D 11/10; F01D 11/12; F01D 11/127; F16J 15/43
See application file for complete search history.

(56) References Cited

U.S. PATENT DOCUMENTS

| 4,386,784 A * | 6/1983 | Banks ..................... F01D 5/225 |
| | | 277/410 |
| 4,513,567 A | 4/1985 | Deveau et al. |
| 6,152,685 A | 11/2000 | Hagi |
| 6,220,602 B1 * | 4/2001 | Webster ............... F16J 15/3288 |
| | | 277/378 |
| 6,450,762 B1 | 9/2002 | Munshi |
| 6,877,952 B2 | 4/2005 | Wilson |
| 6,910,857 B2 * | 6/2005 | Addis ..................... F01D 11/00 |
| | | 277/410 |
| 8,177,476 B2 | 5/2012 | Andrew et al. |
| 9,115,595 B2 | 8/2015 | Snook |
| 9,360,118 B2 | 6/2016 | Fukuhara |

(Continued)

FOREIGN PATENT DOCUMENTS

| GB | 2108586 A | 5/1983 |
| JP | H11294598 A * | 10/1999 |

(Continued)

OTHER PUBLICATIONS

European Search Report Corresponding to Application No. 21212968. 8-1004.

*Primary Examiner* — Ninh H. Nguyen
*Assistant Examiner* — John S Hunter, Jr.
(74) *Attorney, Agent, or Firm* — Dority & Manning, P.A.

(57) ABSTRACT

Flow restricting arrangements and rotor assemblies are provided. A flow restricting arrangement includes a stationary component and a rotating component. The rotating component is radially spaced apart from the stationary component such that a clearance is defined between the stationary component and the rotating component. A first magnet is embedded within the stationary component. A second magnet embedded within the rotating component. A plurality of magnetically responsive particles is contained within the clearance by a magnetic field produced by the first magnet and the second magnet. The plurality of magnetically responsive particles at least partially span the clearance.

20 Claims, 6 Drawing Sheets

(56) References Cited

U.S. PATENT DOCUMENTS

| | | | |
|---|---|---|---|
| 9,611,753 B2* | 4/2017 | Salm | F01D 5/005 |
| 9,784,116 B2 | 10/2017 | Hafner et al. | |
| 2010/0327534 A1 | 12/2010 | Powar et al. | |
| 2011/0027068 A1 | 2/2011 | Floyd, II et al. | |
| 2013/0236302 A1 | 9/2013 | Smith et al. | |
| 2013/0315716 A1 | 11/2013 | Cotroneo | |
| 2015/0285097 A1* | 10/2015 | Spangler | B22C 9/103 |
| | | | 415/116 |
| 2016/0047305 A1 | 2/2016 | Wickert et al. | |
| 2016/0097296 A1 | 4/2016 | Ballard, Jr. et al. | |
| 2018/0010617 A1 | 1/2018 | Casavant et al. | |

FOREIGN PATENT DOCUMENTS

| | | | | |
|---|---|---|---|---|
| JP | 3564286 B2 | 9/2004 | | |
| WO | WO-2005114013 A1 * | 12/2005 | | F01D 11/10 |
| WO | WO-2015152062 A1 * | 10/2015 | | H01F 1/445 |

* cited by examiner

TURBOMACHINE CLEARANCE CONTROL USING MAGNETICALLY RESPONSIVE PARTICLES

FIELD

The present disclosure relates generally to turbomachine clearances. In particular, this disclosure relates to controlling clearances between stationary components and rotating components in a turbomachine.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

In certain applications, a clearance may exist between components that move relative to one another in the turbomachine. For example, a clearance may exist between rotary and stationary components in a rotary machine, such as a compressor, a turbine, or the like. The clearance may increase or decrease during operation of the rotary machine due to temperature changes or other factors. As can be appreciated, a smaller clearance may improve performance and efficiency in a compressor or turbine, because less fluid leaks between blades and a surrounding shroud. However, a smaller clearance also increases the potential for a rub condition. The operating conditions also impact the potential for a rub condition. For example, the potential for a rub condition may increase during transient conditions and decrease during steady state conditions.

Sealing assemblies are often positioned within the clearances to restrict the amount of flow passing through the clearance by keeping the space between the rotating component and the stationary component small without requiring the components to be close to one another.

Known sealing assemblies are most effective once the gas turbine has reached steady state operating conditions. For example, once both the rotor assembly and the stator assembly reach steady state operating temperatures, the assemblies have thermally expanded and fully engage the sealing assembly. As such, an improved sealing assembly for sealing between a rotor assembly and a stator assembly is desired in the art. In particular, a sealing assembly that is effective at restricting flow all operating conditions of the gas turbine is desired.

BRIEF DESCRIPTION

Aspects and advantages of the flow restricting arrangements and rotor assemblies in accordance with the present disclosure will be set forth in part in the following description, or may be obvious from the description, or may be learned through practice of the technology.

In accordance with one embodiment, A flow restricting arrangement for use in a gas turbine is provided. The flow restricting arrangement includes a stationary component and a rotating component. The rotating component is spaced apart from the stationary component such that a clearance is defined between the stationary component and the rotating component. A first magnet is embedded within the stationary component. A second magnet embedded within the rotating component. A plurality of magnetically responsive particles is contained within the clearance by a magnetic field produced by the first magnet and the second magnet. The plurality of magnetically responsive particles at least partially span the clearance.

In accordance with another embodiment, a rotor assembly for a gas turbine is provided. A plurality of rotor blades extending radially outward from a rotor disk. Each rotor blade in the plurality of rotor blades includes a platform, a tip shroud, and an airfoil that extends between the platform and the tip shroud. The tip shrouds of each rotor blade in the plurality of rotor blades collectively form a shroud ring that extends circumferentially around a centerline of the gas turbine. A casing is spaced apart from the shroud ring such that a clearance is defined between the shroud ring and the casing. A plurality of first magnets are embedded within the casing. A plurality of second magnets are embedded within the shroud ring. A plurality of magnetically responsive particles are contained within the clearance by a magnetic field produced by the plurality of first magnets and the plurality of second magnets. The plurality of magnetically responsive particles at least partially spanning the clearance.

These and other features, aspects and advantages of the present flow restricting arrangements and rotor assemblies will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present flow restricting arrangements and rotor assemblies, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present flow restricting arrangements and rotor assemblies, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the term "clearance" or the like shall be understood to refer to a spacing or gap that may exist between two or more components of the system that move relative to one another during operation. The clearance may correspond to an annular gap, a linear gap, a rectangular gap, or any other geometry depending on the system, type of movement, and other various factors, as will be appreciated by those skilled in the art. In one application, the clearance may refer to the radial gap or space between housing components surrounding one or more rotating blades of a compressor, a turbine, or the like. By controlling the clearance using the presently disclosed techniques, the amount of leakage between the rotating blades and the housing may be actively reduced to increase operational efficiency, while simultaneously minimizing the possibility of a rub (e.g., contact between housing components and the rotating blades). As will be appreciated, the leakage may correspond to any fluid, such as air, steam, combustion gases, and so forth.

As discussed above, a radial gap between the turbine blades and a shroud may increase or decrease during operation due to temperature changes or other factors. For instance, as the turbine heats up during operation, thermal expansion of the turbine housing components may cause the shroud to move radially away from the rotational axis, thus increasing the clearance between the blades and the shroud. This is generally undesirable because combustion gases that bypass the blades via the radial gap are not captured by the blades and are, therefore, not translated into rotational energy. This reduces the efficiency and power output of the turbine engine.

Figure 1:
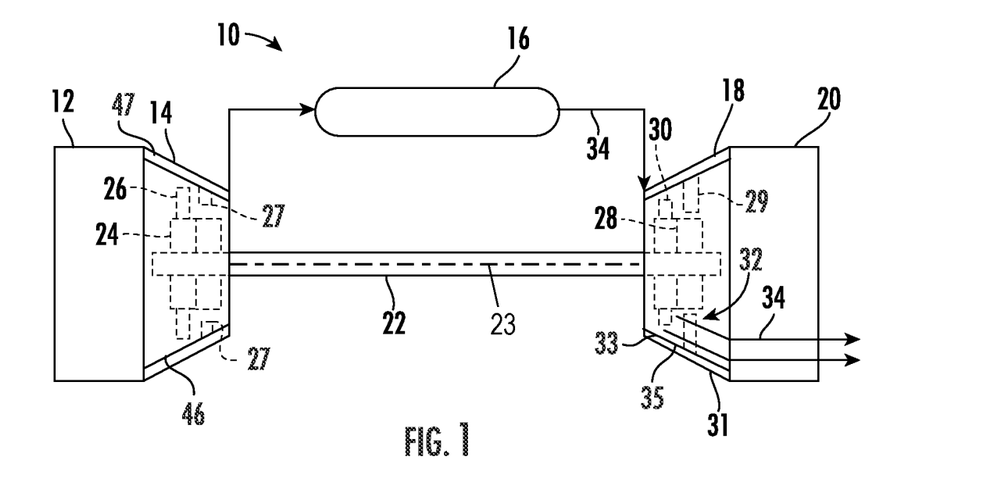
FIG. 1 is a schematic illustration of a turbomachine in accordance with embodiments of the present disclosure.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14. The compressor 12 further includes one or more stator vanes 27 arranged circumferentially around the shaft 22. The stator vanes 27 may be fixed to at least one of an outer casing 47 and an inner casing 46 that extends circumferentially around the rotor blades 26.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer turbine casing 31 and an inner turbine casing 33 that circumferentially surround the portion of the shaft 22 and the rotor blades 30, thereby at least partially defining a hot gas path 32 through the turbine section 18. The inner turbine casing 33 may be configured to support a plurality of stages of stationary nozzles 29 extending radially inwardly from the inner circumference of the inner turbine casing 33. The inner turbine casing 33 may also be configured to support a plurality of shroud sections or blocks 35 that, when installed around the inner circumference of the inner turbine casing 33, abut one another so as to define a substantially cylindrical shape surrounding the shaft 22.

During operation, a working fluid such as air flows through the inlet section 12 and into the compressor section 14 where the air is progressively compressed, thus providing pressurized air to the combustors of the combustor section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

As shown, the gas turbine 10 may define an axial direction A substantially parallel to and/or along an axial centerline 23 of the gas turbine 10, a radial direction R perpendicular to the axial centerline 23, and a circumferential direction C extending around the axial centerline 23.

Figure 2:
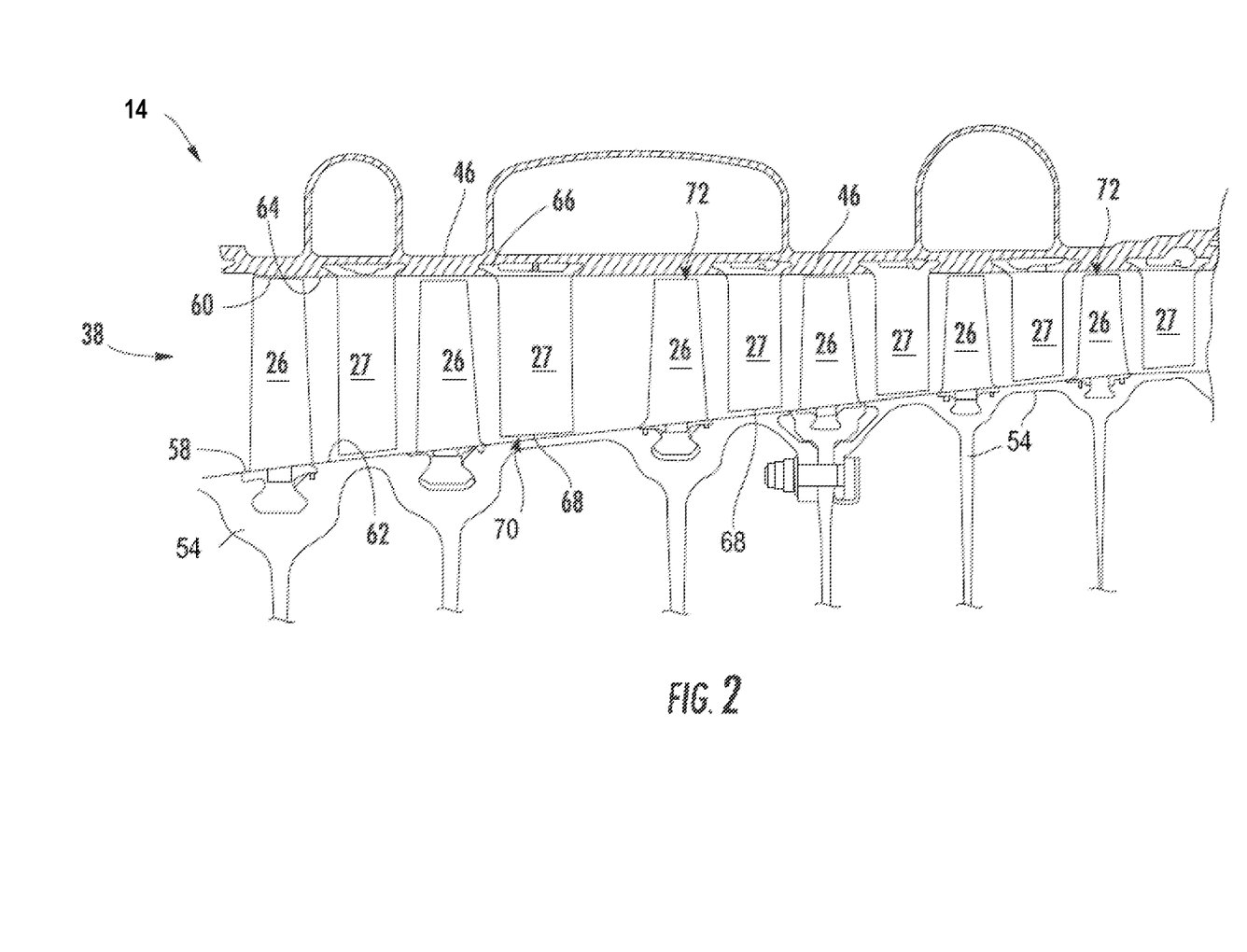
FIG. 2 illustrates a cross sectional view of a compressor section in accordance with embodiments of the present disclosure.

FIG. 2 is a cross sectional view of the major components of an exemplary gas turbine compressor section, including rotor and stator assemblies. The compressor section 12 includes a rotor assembly positioned within inner casing 46 to define a compressed air 38 flow path. The rotor assembly also defines an inner flow path boundary 62 of flow path 38, while the stator assembly defines an outer flow path boundary 64 of compressed air 38 flow path. The compressor section 12 includes a plurality of stages, with each stage including a row of circumferentially-spaced rotor blades 26 and a row of stator vanes 27. In this embodiment, rotor blades 26 are coupled to a rotor disk 54 with each rotor blade extending radially outwardly from rotor disk 54. Each rotor blade 26 includes an airfoil that extends radially from an inner blade platform 58 to rotor blade tip 60. A clearance 72 may be defined radially between the tip 60 of the rotor blade 26 airfoil and the inner casing 46. Similarly, the stator assembly includes a plurality of rows of stator vanes 27 with each row of vanes 27 positioned between adjacent rows of rotor blades 26. The compressor stages are configured to cooperate with a compressed air 38 working fluid, such as ambient air, with the working fluid being compressed in succeeding stages. Each row of stator vanes 27 extend radially inward from the inner casing 46 and includes an airfoil that extends from an outer vane platform 66 to a vane tip 68. A clearance 70 may be defined both radially between the tip 68 of the stator vane 27 airfoil and the rotor disk 54. Each airfoil includes a leading edge and a trailing edge as shown.

Figure 3:
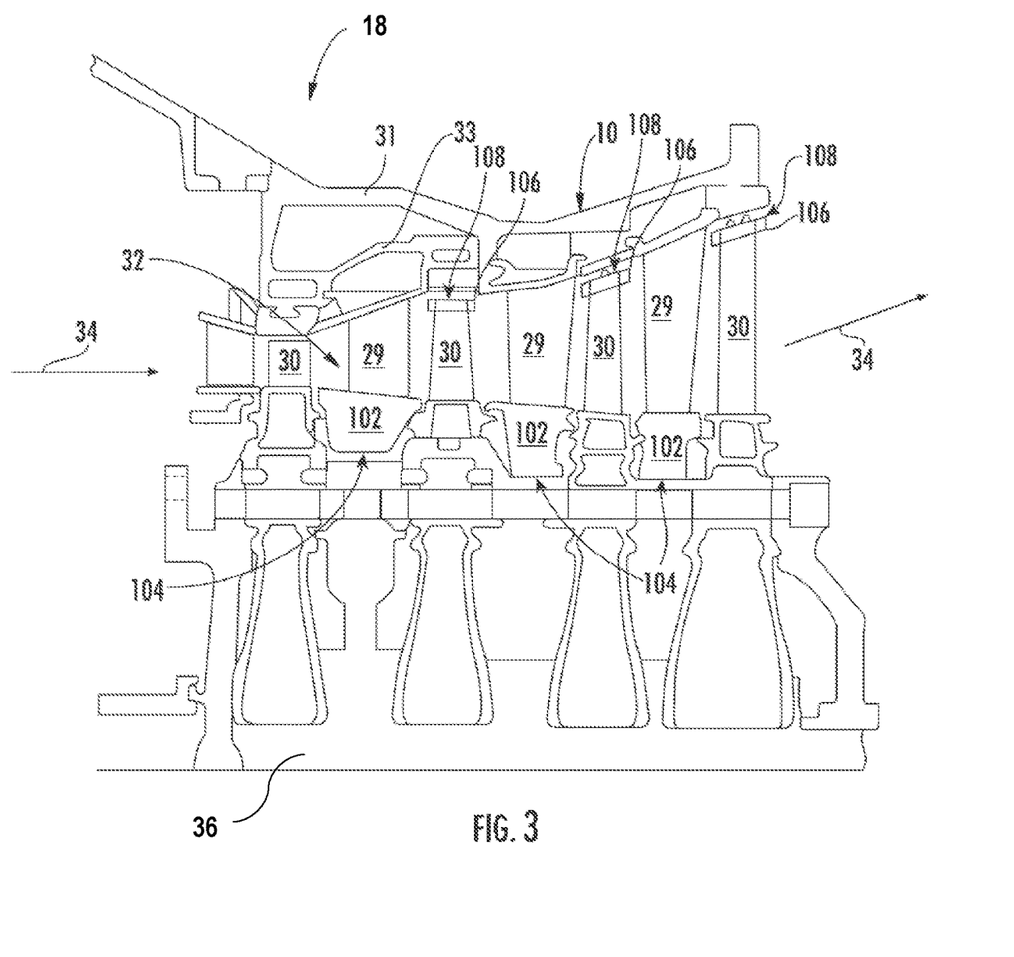
FIG. 3 illustrates a cross-sectional view of a turbine section, in accordance with embodiments of the present disclosure.

FIG. 3 illustrates an exemplary turbine section 18 of the gas turbine 10 including a plurality of turbine stages arranged in serial flow order. Each stage of the turbine includes a row of stationary turbine nozzles or vanes (e.g., stationary nozzles 29) disposed axially adjacent to a corresponding rotating row of turbine rotor blades (e.g., blades 30). Four turbine stages are illustrated in FIG. 3. The exact number of stages of the turbine section 18 may be more or less than the four stages illustrated in FIG. 3. The four stages are merely exemplary of one turbine design and are not intended to limit the presently claimed turbine rotor blade in any manner.

Each stage comprises a plurality stationary nozzles 29 and a plurality of turbine rotor blades 30. The stationary nozzles 29 are mounted to the inner turbine casing 33 and are annularly arranged about an axis of a turbine rotor 36. Each stationary nozzle 29 may extend radially inward from the inner casing 33 to a stator shroud 102 coupled to the tip of the stationary nozzle 29. When the stationary nozzles 29 are installed around the inner circumference of the inner turbine casing 33, the stator shrouds 102 abut one another so as to define a substantially cylindrical shape surrounding the shaft turbine rotor 36. A clearance 104 may be defined radially between stator shroud 102 and the turbine rotor 36. The clearance 104 may extend continuously in the circumferential direction C around the turbine rotor 36.

As shown, the turbine rotor blades 30 are annularly arranged about the turbine rotor 36 and are coupled to the turbine rotor 36. Each turbine rotor blade 30 may include an airfoil having a leading edge, a trailing edge, a pressure side surface, and a suction side surface. In some embodiments, as shown, the turbine rotor blade 30 may include a tip shroud 106. When the turbine rotor blades 30 are installed around the inner circumference of the inner turbine casing 33, the tip shrouds 106 may abut one another so as to define a substantially cylindrical shape surrounding the airfoils and of the turbine rotor blades 30 and the turbine rotor 36. In many embodiments, a clearance 108 may be defined radially between stator shroud 102 and the turbine rotor 36. The clearance 108 may extend continuously in the circumferential direction C around the turbine rotor 36.

It will be appreciated that the stationary nozzles 29 and turbine rotor blades 30 are disposed or at least partially disposed within the hot gas path 32 of the turbine section 18. The various stages of the turbine 10 at least partially define the hot gas path 32 through which combustion gases 34 flow during operation of the gas turbine 10.

Figure 4:
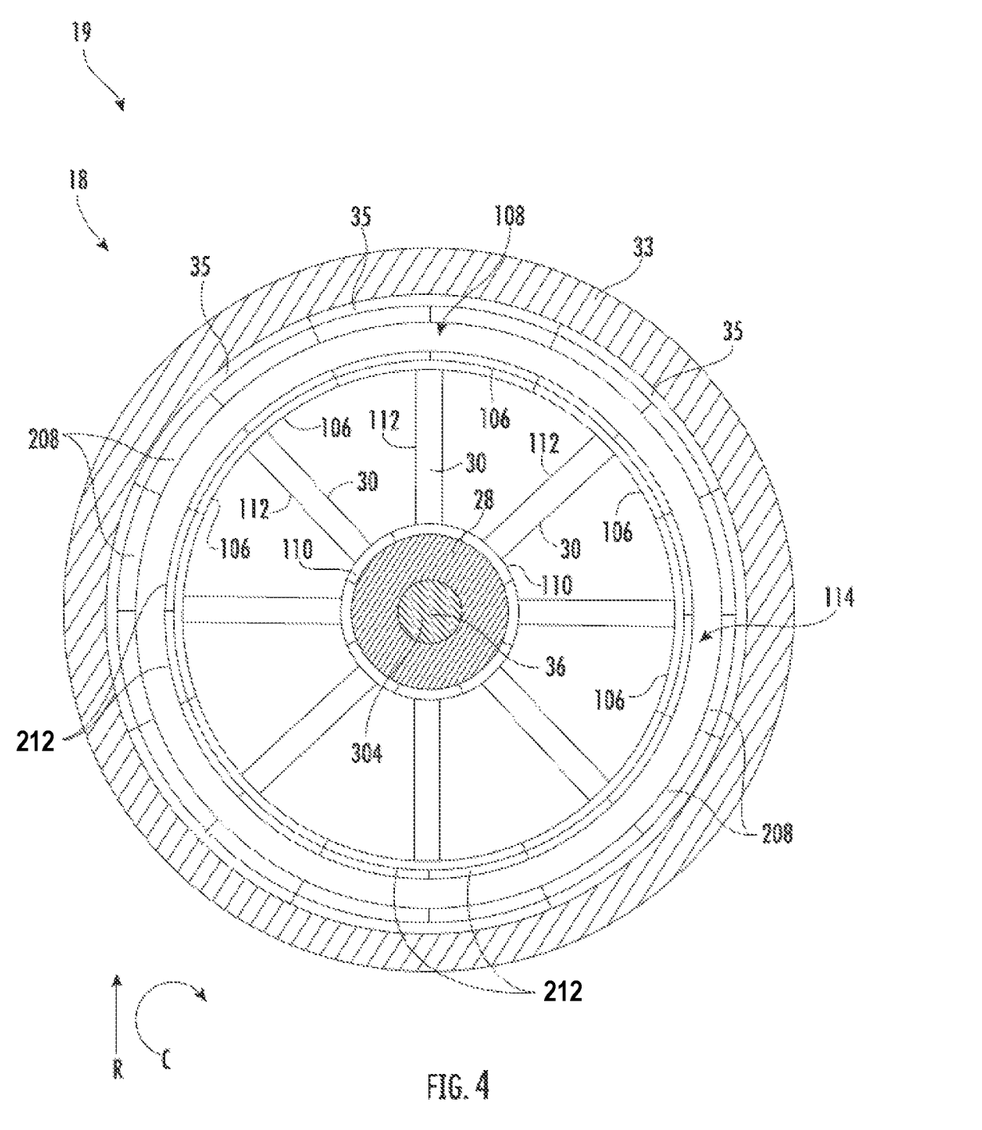
FIG. 4 illustrates a cross-sectional view of a rotor assembly of a turbine section, in accordance with embodiments of the present disclosure.

FIG. 4 illustrates a cross-sectional view of a rotor assembly 19 of the turbine section 18 from along an axial centerline of the gas turbine 10, in accordance with embodiments of the present disclosure. As shown in FIG. 4, a plurality of rotor blades 29 extend radially outward from a rotor disk 28. In many embodiments, each rotor blade 30 in the plurality of rotor blades 29 includes a platform 110, a tip shroud 106, and an airfoil 112 that extends radially between the platform 110 and the tip shroud 106. As shown, the tip shrouds 106 of each rotor blade 30 in the plurality of rotor blades 29 abut one another to collectively form a shroud ring 114 that extends continuously circumferentially around a centerline of the gas turbine 10. For example, the shroud ring 114 extends around the turbine rotor 36. In many embodiments, the inner turbine casing 33 may be radially spaced apart from the shroud ring 114 such that a clearance 108 is defined between the shroud ring 114 and the inner turbine casing 33. In some embodiments, the inner turbine casing 33 may support a plurality of shroud sections or blocks 35 that, when installed around the inner circumference of the inner turbine casing 33, abut one another so as to define a substantially cylindrical shape surrounding a portion of a turbine rotor 36 of the gas turbine 10. For example, the shroud blocks 35 may be supported by the inner turbine casing 33 such that they encase or surround one of a plurality of stages of rotor blades 29 turbine section 18. In such embodiments, the clearance 108 may be defined between the tip shroud 106 of the rotor blades 29 and the shroud blocks 35 of the inner turbine casing 33.

Figure 5:
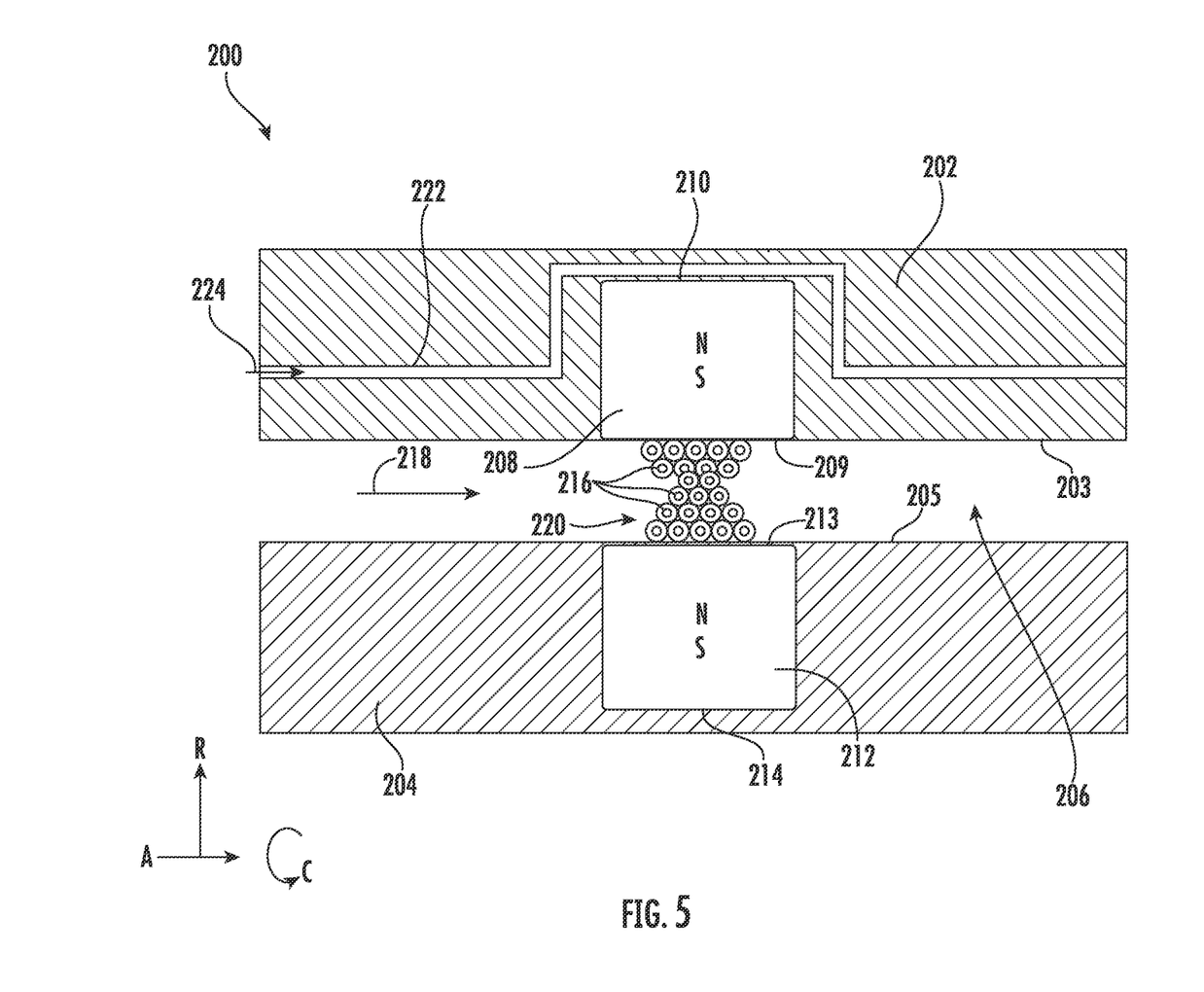
FIG. 5 illustrates an exemplary flow restricting arrangement, in accordance with embodiments of the present disclosure.

FIG. 5 illustrates a flow restricting arrangement 200 for use in a turbomachine, such as the gas turbine 10 described herein, in accordance with embodiments of the present disclosure. The flow restricting arrangement 200 may include a stationary component 202 of the gas turbine 10, such as the inner casing 46 of the compressor section 14, one or more stator vanes 27 of the compressor section 14, the inner turbine casing 33, one or more stationary nozzles 29 of the turbine section 18, one or more shroud blocks 35, or other stationary gas turbine 10 components.

The flow restricting arrangement 200 may further include a rotating component 204, i.e., a component that rotates in the circumferential direction C of the gas turbine 10. In many embodiments, the rotating component 204 may be directly or indirectly attached to the shaft 22, thereby rotating in the circumferential direction C along with other gas turbine 10 components. The rotating component 204 may be, but is not limited to, a rotor blade 26 of the compressor section 14, a rotor disk 24 of the compressor section 14, a rotor blade 30 of the turbine section 18, or a rotor disk 28 of the turbine section 18.

As shown in FIG. 5, a clearance 206 may be defined between the stationary component 202 and the rotating component 204, in order to prevent frictional wear between the stationary component 202 and the rotating component 204. As may be appreciated, due to the high operating temperatures of the gas turbine 10, either or both of the stationary component 202 and the rotating component 204 may experience thermal expansion and contraction, thereby altering the distance between the components 202, 204 and the clearance 206. The clearance 206 may between the stationary component 202 and the rotating component 204 may be representative of any of the other clearances discussed herein, e.g., clearance 70, clearance 72, clearance 104, and/or clearance 108. In exemplary embodiments, the clearance 206 may be defined between the turbine rotor blade 29 tip shrouds 106 and the plurality of shroud blocks 35 (FIG. 4). One of ordinary skill in the art should understand that the present subject matter is not limited to any particular configuration and that the flow restricting arrangement 200 described herein may be advantageous for any stationary component and rotating component of the gas turbine 10.

As shown in FIG. 5, the flow restricting arrangement 200 may further include a first magnet 208 embedded within the stationary component 202. For example, the first magnet 208 may be embedded within the stationary component 202 such that a radially inner surface 203 of the stationary component 202 is flush, and aligns with, a radially inner surface 209 of the first magnet 208. In many embodiments, the stationary component 202 may define a groove or slot 210 in the radial and circumferential directions that the first magnet 202 is positioned within. In particular embodiments, the first magnet 208 may be fixedly coupled (via a braze or weld joint) to the stationary component 202 within the slot 210. In other embodiments, the first magnet 208 may be coupled to slot 210 of the stationary component 202 via an interference fit.

In exemplary embodiments, a second magnet 212 may be embedded within the rotating component 204. For example, the second magnet 212 may be embedded within the rotating component 204 such that a radially outer surface 205 of the rotating component 204 is flush, and aligns with, a radially outer surface 213 of the second magnet 208. In this way, the radially outer surfaces 205, 213 may form a single smooth and continuous surface in the axial direction A. In many embodiments, the rotating component 204 may define a groove or slot 214 in the radial and circumferential directions, in which the second magnet 212 is positioned. In particular embodiments, the second magnet 2012 may be fixedly coupled (via a braze or weld joint) to the rotating component 204 within the slot 214. In other embodiments, the second magnet 212 may be coupled to slot 214 of the rotating component 204 via an interference fit. In various embodiments, the first magnet 208 and the second magnet 212 may be coaxially aligned with one another, such that they share a common axis in the radial direction R.

In many embodiments, a plurality of magnetically responsive particles 216 may be contained within the clearance 206 by a magnetic field produced by the first magnet 208 and the second magnet 212. As should be understood, the size of plurality of magnetic particles 216 may be exaggerated for the purposes of illustration and example. In exemplary embodiments, the plurality of magnetically responsive particles 216 may contact one another such that they span the clearance 206 (e.g. are grouped between the stationary component and the rotating component by the magnets 208, 212), such that the leakage flow 218 is restricted through the clearance 206. In many embodiments, the plurality of magnetically responsive particles 216 may be magnetically coupled to both the first magnet 208 and the second magnet 212, such that they extend partially cover the clearance 206 and provide a restriction or blockage to the leakage flow 218. For example, each magnetically responsive particle 216 in the plurality of magnetically responsive particles 216 may contact at least one of a neighboring magnetically responsive particle 216, the first magnet 208, or the second magnet 212, such that the plurality of magnetically responsive particles 216 form a chain or a linkage between the magnets 208, 212 that spans the clearance 206.

The leakage flow 218 may be excess air (if flow restricting arrangement 200 is within compressor section 14) or excess combustion gases (if flow restricting arrangement 200 is in turbine section 18). As may be appreciated, minimizing the amount of leakage flow 218 passing across the clearance 206 may advantageously increase the overall efficiency of the gas turbine 10 by minimizing waste. In many embodiments, the plurality of magnetically responsive particles 216 may extend radially across the entire clearance 206, e.g., from the outer surface 213 of the second magnet 212 to the inner surface 209 of the first magnet 208, such that a restriction or seal 220 is formed between the stationary component 202 and the rotating component 204 by the plurality of magnetically responsive particles 216. The plurality of magnetically responsive particles 216 may be contained between the magnets 208, 212 in a group such that they do not break away from the seal 220 and travel axially downstream.

In exemplary embodiments, the plurality of magnetically responsive particles 216 are movable relative to each other and relative to the first magnet 208 and the second magnet 212 within the clearance 206. For example, the plurality of magnetically responsive particles 216 may be slidable relative to one another and relative to the magnets 208, 212, thereby allowing the rotating component 204 to move in the circumferential direction C without breaking or impacting the effectiveness of the seal 220. In addition, the stationary component 202 and the rotating component 204 may thermally expand or contract without impacting the seal 220 because plurality of magnetically responsive particles 216 may move and realign themselves due to the magnetic field produced by the magnets 208, 212. For example, the clearance 206 may vary (i.e. increase or decrease in size) based on thermal transients and/or operating conditions of the turbomachine. In response to variations in the clearance 206, the magnetically responsive particles 216 may realign and/or reposition themselves to span the clearance 206, thereby restricting flow across the flow restricting assembly 200. In this way, the plurality of magnetically responsive particles 216 and the magnets 208, 212 may form an active clearance control that is effective at any gas turbine 10 operating condition.

In many embodiments, the first magnet 208 and the second magnet 212 may be permanent magnets, such that the magnets 208, 212 are made of a material(s) that is magnetized by an external magnetic field and remains magnetized after the external field is removed. In this way, both the first magnet 208 and the second magnet 212 continuously create their own magnetic field, in which the plurality of magnetically responsive particles 216 are contained. In many embodiments, the magnets 208, 212 may each be in the form of a piece of metal material that has its component atoms so ordered that the material exhibits properties of magnetism, such as attracting other iron-containing objects or aligning itself in an external magnetic field. Although the magnets 208, 212 are shown in FIG. 5 as having the poles (north pole "N" and south pole "S") labeled on specific ends, it is envisioned to be within the scope of the present disclosure that each of the poles may be switched, thereby yielding the same configuration but with an opposite magnetic pole orientation.

In exemplary embodiments, the magnets 208, 212 may be Alnico magnets, such that they are permanent magnets that are primarily made up of a combination of aluminum (Al), nickel (Ni), and cobalt (Co) but may also include copper, iron and titanium. Alnico magnets may be capable of operation in extremely high temperatures, such as upwards of 1000° F.

In various embodiments, one of the stationary component 202 and/or the rotating component 204 may define a cooling channel 222 that functions the magnets 208, 212. Although the cooling channel 222 is shown in FIG. 5 as being defined in the stationary component 202, the cooling channel 222 may alternatively or additionally be defined in the rotating component 204. As shown, the cooling channel 222 may extend along the stationary component 202, around the first magnet 208, such that a flow of cooling air 224 may travel through the cooling channel 222 and cool the magnet 208. The cooling channel 222 may provide a flow of cooling air 224 around the magnet 208. The flow of cooling air 224 ensures that magnet 208 maintains an operable temperature and does not overheat.

In many embodiments, the plurality of magnetically responsive particles 216 may be formed from ferrous materials (or combinations of ferrous materials), such as iron, nickel, cobalt, or others. In such embodiments, such that the plurality of magnetically responsive particles 216 may be attracted to the magnets 208, 212. In other embodiments, the plurality of magnetically responsive particles 216 may be permanent magnet particles themselves.

In many embodiments, each magnetically responsive particle 216 in the plurality of magnetically responsive particles 216 may coated with an oxidation resistant coating, in order to prevent the plurality of magnetically responsive particles 216 from rusting due to exposure to oxygen, thereby advantageously increasing the life of the magnetically responsive particles 216. In various embodiments, the plurality of magnetically responsive particles 216 may be coated with a thermal barrier coating ("TBC"), in order to increase the plurality of magnetically responsive particles 216 resistance to the high temperatures of the gas turbine 10.

In many embodiments, each magnetically responsive particle in the plurality of magnetically responsive particles defines a volume of between about 0.5 $in^3$ and about $5 \times 10^{-10}$ $in^3$. In various embodiments, each magnetically responsive particle in the plurality of magnetically responsive particles defines a volume of between about 0.25 $in^3$ and about $1 \times 10^{-8}$ $in^3$. In other embodiments, each magnetically responsive particle in the plurality of magnetically responsive particles defines a volume of between about 0.1 $in^3$ and about $5 \times 10^{-6}$ $in^3$. The small volumetric size of the plurality of magnetic particles 216 advantageously allows them to move relative to one another while maintaining the seal 220, thereby allowing the components of the gas turbine 10 to thermally expand and contract without impacting the effectiveness of the seal 220.

Figure 6:
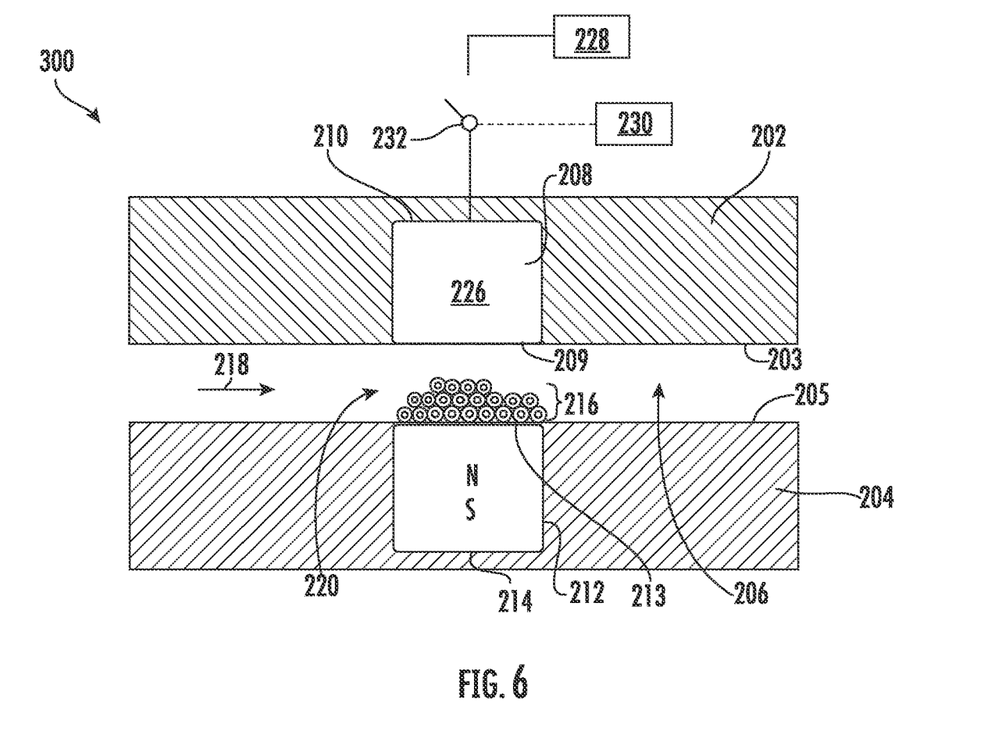
FIG. 6 illustrates an exemplary flow restricting arrangement, in accordance with embodiments of the present disclosure.
Figure 7:
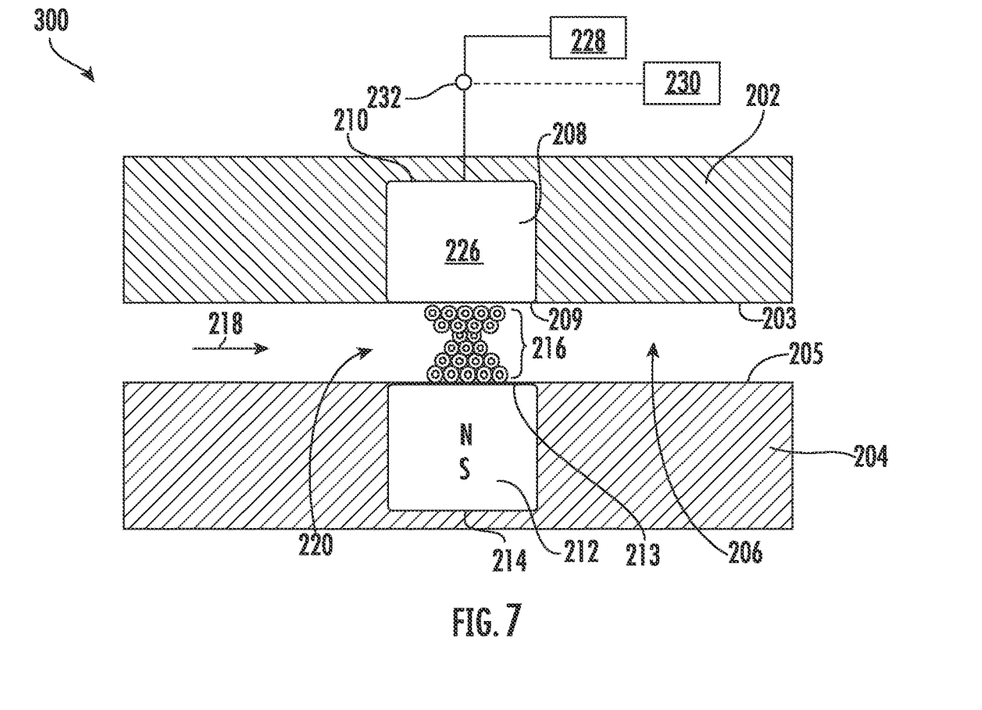
FIG. 7 illustrates an exemplary flow restricting arrangement, in accordance with embodiments of the present disclosure.

FIG. 6 illustrates a flow restricting arrangement 300 having an electromagnet 226 that is deactivated, and FIG. 7 illustrates the flow restricting arrangement 300 in which electromagnet 226 is activated, in accordance with embodiments of the present disclosure. In some embodiments (as shown), the first magnet 208 may be an electromagnet 226, such that the electromagnet 226 is positioned within the stationary component 202. In other embodiments (not shown), the second magnet 212 may be an electromagnet 226, such that the electromagnet 226 is positioned within the rotating component 204. As shown, the electromagnet 226 configured to be activated and deactivated. When the electromagnet 226 is activated, the electromagnet 226 emits an electromagnetic field that attracts the plurality of magnetically responsive particles 216. For example, the electromagnet 226 may be electrically coupled to a power supply 228. A switch 232 may deactivate the electromagnet 226 by disconnecting the power supply 228 in an open position (FIG. 6). When in a closed position (FIG. 7), the switch may connect the electromagnet 226 to the power supply 228, thereby enabling the electromagnetic field, which extends the plurality of magnetically responsive particles 216 across the clearance 206. The switch 232 may be in operative communication with a controller 230, which may open or close the switch thereby activating or deactivating the electromagnet 226. In this way, the electromagnet 226 may advantageously allow the seal 220 to be deactivated when necessary, such as during an assembly process or repair of the gas turbine 10.

In exemplary embodiments, as shown best in FIG. 4, the first magnet 208 may be a plurality of first magnets 208 arranged circumferentially around an axial centerline 23 of the gas turbine 10, e.g., around the turbine rotor 36. Similarly, the second magnet 212 may a plurality of second magnets 212 arranged circumferentially around an axial centerline 23 of the gas turbine 10. This arrangement advantageously allows the plurality of magnetic particles 216 to be contained within a magnetic field in the entire circumferential direction C, thereby restricting the leakage flow 218 at every circumferential location.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A flow restricting arrangement for use in a turbomachine, the flow restricting arrangement comprising:
   a stationary component;
   a rotating component spaced apart from the stationary component such that a clearance is defined between the stationary component and the rotating component;
   a first magnet embedded within the stationary component;
   a second magnet embedded within the rotating component; and
   a plurality of magnetically responsive particles contained within the clearance by a magnetic field produced by the first magnet and the second magnet, the plurality of magnetically responsive particles at least partially spanning the clearance, wherein the plurality of magnetically responsive particles is formed from a ferrous material, and wherein a cooling channel is defined in one of the stationary component or the rotating component, the cooling channel extending around one of the first magnet or the second magnet.

2. The flow restricting arrangement as in claim 1, wherein each magnetically responsive particle in the plurality of magnetically responsive particles contacts at least one of a neighboring magnetically responsive particle, the first magnet, or the second magnet, and wherein the plurality of magnetically responsive particles are movable relative to each other and relative to the first magnet and the second magnet within the clearance.

3. The flow restricting arrangement as in claim 1, wherein the clearance varies based on thermal transients of the turbomachine, and wherein the plurality of magnetically responsive particles realign in response to variation in the clearance.

4. The flow restricting arrangement as in claim 1, wherein the first magnet and the second magnet are permanent magnets.

5. The flow restricting arrangement as in claim 1, wherein the first magnet and the second magnet are alnico magnets.

6. The flow restricting arrangement as in claim 1, wherein each magnetically responsive particle in the plurality of magnetically responsive particles is coated with an oxidation resistant coating.

7. The flow restricting arrangement as in claim 1, wherein each magnetically responsive particle in the plurality of magnetically responsive particles defines a volume of between about 0.5 $in^3$ and about $5 \times 10^{-10}$ $in^3$.

8. The flow restricting arrangement as in claim 1, wherein one of the first magnet and the second magnet is an electromagnet, the electromagnet configured to be activated and deactivated, and wherein when the electromagnet is activated the electromagnet emits an electromagnetic field that attracts the plurality of magnetically responsive particles.

9. The flow restricting arrangement as in claim 1, wherein the first magnet is a plurality of first magnets arranged circumferentially around an axial centerline of the turbomachine.

10. The flow restricting arrangement as in claim 1, wherein the second magnet is a plurality of second magnets arranged circumferentially around an axial centerline of the turbomachine.

11. The flow restricting arrangement as in claim 1, wherein the rotating component is a rotor blade, and wherein the stationary component is an inner turbine casing.

12. The flow restricting arrangement as in claim 1, wherein the first magnet is embedded within the stationary component such that a radially inner surface of the first magnet is flush and aligns with a radially inner surface of the stationary component, and wherein the second magnet is embedded within the rotating component such that a radially outer surface of the second magnet is flush and aligns with a radially outer surface of the rotating component.

13. The flow restricting arrangement as in claim 1, wherein the stationary component defines a first slot, wherein the rotating component defines a second slot, wherein the first magnet is disposed in the first slot and the second magnet is disposed in the second slot.

14. A rotor assembly for a turbomachine, the rotor assembly comprising:
    a plurality of rotor blades extending radially outward from a rotor disk, each rotor blade in the plurality of rotor blades including a platform, a tip shroud, and an airfoil extending between the platform and the tip shroud, wherein the tip shrouds of the plurality of rotor blades collectively form a shroud ring that extends circumferentially around a centerline of the turbomachine;
    a casing radially spaced apart from the shroud ring such that a clearance is defined between the shroud ring and the casing;
    a plurality of first magnets embedded within the casing;
    a plurality of second magnets embedded within the shroud ring; and
    a plurality of magnetically responsive particles contained within the clearance by a magnetic field produced by the plurality of first magnets and the plurality of second magnets, the plurality of magnetically responsive particles at least partially spanning the clearance, wherein the plurality of magnetically responsive particles is formed from a ferrous material, and wherein a cooling channel is defined in one of the casing or the shroud ring, the cooling channel extending around one of the first magnet or the second magnet.

15. The rotor assembly as in claim 14, wherein the plurality of magnetically responsive particles are movable relative to each other and relative to the plurality of first magnets and the plurality of second magnets within the clearance.

16. The rotor assembly as in claim 14, wherein the plurality of first magnets and the plurality of second magnets are permanent magnets.

17. The rotor assembly as in claim 14, wherein the plurality of first magnets and the plurality of second magnets are alnico magnets.

18. The rotor assembly as in claim 14, wherein each magnetically responsive particle in the plurality of magnetically responsive particles is coated with an oxidation resistant coating.

19. The rotor assembly as in claim 14, wherein each magnetically responsive particle in the plurality of magnetically responsive particles defines a volume of between about 0.5 $in^3$ and about $5 \times 10^{-10}$ $in^3$.

20. The rotor assembly as in claim 14, wherein one of the plurality of first magnets and the plurality of second magnets comprises an electromagnet, the electromagnet is configured to be activated and deactivated, and wherein when the electromagnet is activated the electromagnet emits an electromagnetic field that attracts the plurality of magnetically responsive particles.

* * * * *